Sept. 2, 1941.  C. G. GERHOLD  2,254,522
CONVERSION OF HYDROCARBONS
Filed March 8, 1939
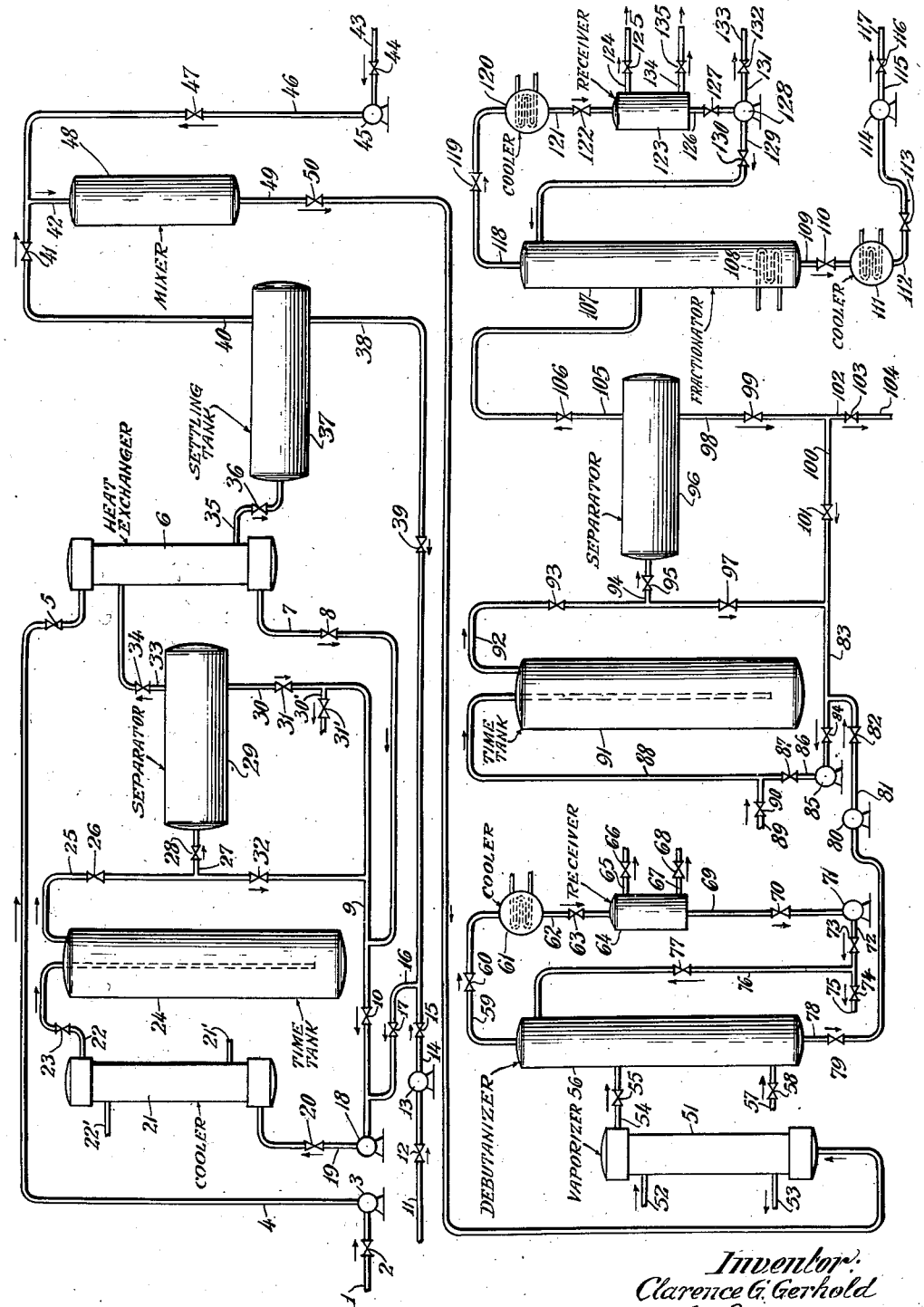
Inventor:
Clarence G. Gerhold
By Lee J. Gary
Attorney.

Patented Sept. 2, 1941

2,254,522

UNITED STATES PATENT OFFICE 2,254,522

CONVERSION OF HYDROCARBONS

Clarence G. Gerhold, Chicago, Ill., assignor to Universal Oil Products Company, Chicago, Ill., a corporation of Delaware Application March 8, 1939, Serial No. 260,494

3 Claims. (Cl. 196—10)

The process of this invention relates particularly to the conversion of butenes contained in 4-carbon atom hydrocarbon fractions into normally liquid hydrocarbons boiling within the range of motor fuel by catalyzed polymerization reactions.

The invention is more specifically concerned with the manufacture of octenes of isomeric structure which are utilizable as such as high anti-knock blending material in gasolines inferior in this respect, or hydrogenatable to produce high octane number iso-octanes which are particularly adapted to use in airplane engines.

The manufacture of high octane number fuels has received considerable impetus from the demands of high compression ratio airplane engines which operate with a hot intake manifold and which employ superchargers at high altitudes.

Fuels for this service must be completely reliable and not given to depositing gum in the feed lines or carburetors and thus far the best answer to the problem has been the manufacture of mixtures of iso-octanes which have both high anti-knock rating and complete saturation rendering them incapable of forming gums. At the present time, considerable effort is being expended to produce these octanes from 4-carbon atom hydrocarbons comprising both butenes and butanes present in gas mixtures produced incidental to oil cracking operations. The present invention is a contribution to this type of process.

Among other methods which have been used to polymerize the butenes present in gas fractions obtained from cracked gas mixtures are those employing mineral acid catalysts under different conditions of operation which have been found conducive to the production of octenes. Sulfuric acid is employed for this purpose in the form of aqueous solutions of different concentrations. The present invention is an improvement in a process for polymerizing butenes in the presence of sulfuric acid as catalyst.

In one specific embodiment the present invention comprises improvements in a process in which a 4-carbon atom hydrocarbon fraction containing isobutene and n-butenes is subjected to contact with sulfuric acid under conditions adequate to effect inter-polymerization of isobutene and n-butenes, the sulfuric acid is separated from the 4-carbon atom hydrocarbon fraction containing dissolved polymers, said sulfuric acid is recycled to further contact with incoming 4-carbon atom hydrocarbon fraction, caustic soda solution is added to the acid treated 4-carbon atom hydrocarbon fraction and dissolved polymers whereby sulfuric acid is neutralized, and substantially olefin-free 4-carbon atom hydrocarbons are removed from the polymers in a fractionator; said improvements comprise heating said fractionator by direct steam injection, and subjecting debutanized polymers to contact with caustic soda solution and steam whereby sulfuric acid esters are hydrolyzed, and thereafter the polymers are subjected to distillation to separate an octene fraction hydrogenatable to iso-octane of high octane number.

In the process for producing iso-octenes from mixtures of butenes and butanes by polymerization of the former with sulfuric acid at temperatures substantially above normal atmospheric temperature, a part of the acid entering the reaction forms esters. In order to prepare the iso-octene fraction for hydrogenation to iso-octane, it is necessary to remove these esters. Ordinarily these esters are decomposed by externally applied heat, but this procedure results in the formation of sulfur dioxide and of other sulfur compounds arising from subsequent action of sulfur dioxide on olefins. According to the improved process of the present invention all heating of the polymer products is carried out in intimate contact with water thereby promoting hydrolysis of the esters present and avoiding their decomposition with the resultant liberation of sulfur dioxide which would react with the polymers to produce contaminating sulfur compounds and also cause corrosion of the equipment. These improved results are obtained by effecting the necessary heating by direct steam injection at two points in the process flow.

From the debutanizer, in which the butane is separated from the polymer, the customary reboiler is eliminated and direct steam injection substituted, the condensate from this direct steam injection being withdrawn from the bottom of the debutanizer together with the polymer. Such substitution of direct steam injection for external heating makes it possible to operate the debutanizer at a higher bottom temperature, without thermal decomposition of esters, so that a second debutanization of the polymers is unnecessary.

Direct steam injection is utilized, also, in the hydrolysing step of the process in which the debutanized polymers are heated with caustic soda solution for effecting hydrolysis and removal of small amounts of contaminating sulfuric acid esters.

To indicate in a general way the type of process flow which characterizes the present invention, the attached drawing has been provided which indicates diagrammatically by the use of conventional inter-connected units drawn in side elevation an arrangement of plant apparatus in which operations typical of the process may be carried out.

Line 1, containing valve 2, indicates a charging line for the admission of the 4-carbon atom hydrocarbon fraction containing isobutene and normal butenes, such as may be obtained as an overhead in the stabilization of a primarily cracked naphtha. Pump 3 is provided in case the charge is not under sufficient pressure to permit the proper flow through the succeeding equipment, though if the gases are available under sufficient pressure, usually in the approximate order of 150–600 pounds per square inch, this pump may be dispensed with. From pump 3, line 4, containing valve 5, leads to heat exchanger 6 in which the 4-carbon atom hydrocarbon fraction is warmed, after which it is withdrawn through line 7, containing valve 8 and is conducted into line 9, containing valve 10, beyond which the 4-carbon atom hydrocarbon fraction is mixed with 60–70% sulfuric acid introduced in the following manner:

Sulfuric acid of the desired concentration is introduced from an outside source through line 11, containing valve 12, by pump 13 discharging through line 14 and valve 15, into line 16 and valve 17 and thence into line 9 between valve 10 and pump 18. From pump 18 the commingled sulfuric acid and 4-carbon atom hydrocarbon fraction are passed through line 19, containing valve 20, to cooler 21, provided with lines 21' and 22' for circulation of a cooling medium, and then are conducted through line 22, containing valve 23, to the inlet line of time-tank 24. Although only one time-tank 24 is shown in the diagrammatic drawing it is within the scope of this invention to use a plurality of such time-tanks each maintained at a temperature in the approximate range of 175–200° F. From the time-tank 24, or a plurality of time-tanks, the mixture of hydrocarbons and sulfuric acid may be conducted through line 25, containing valve 26, to line 27, containing valve 28, and thence to separator 29.

Sulfuric acid separating in separator 29 is withdrawn through line 30, containing valve 31, and thence passed into line 9, already mentioned. Also, the mixture of hydrocarbons and sulfuric acid contained in line 25 may be passed through valves 26 and 32 into line 9, to be mixed therein with the original hydrocarbon charging stock and recycled by pump 18 to cooler 21 and later to time-tank 24. If desired, used sulfuric acid may be withdrawn through branch line 30' containing valve 31' and conducted to waste or storage.

The hydrocarbon layer, separating in separator 29 and comprising mainly a solution of butene polymers in butane-butene fraction, is withdrawn through line 33, containing valve 34, and passed into heat exchange relationship with the incoming 4-carbon atom hydrocarbon fraction in heat exchanger 6, already mentioned, being then conducted through line 35, containing valve 36, to settling tank 37 wherein entrained sulfuric acid separates and is returned through line 38, containing valve 39, to line 16 in which it mixes with the incoming fresh sulfuric acid. From the top of settling tank 37 the polymer solution is conducted through line 40, containing valve 41, to line 42 in which it mixes with caustic soda solution introduced from an outside source by way of line 43, containing valve 44, by pump 45 discharging through line 46 and valve 47 into line 42, already mentioned. In this line it is commingled with the polymer product dissolved in the acid treated 4-carbon atom hydrocarbon fraction. From line 42 the mixture of hydrocarbons and caustic soda solution passes through mixer 48, line 49 and valve 50 to vaporizer 51 heated conveniently by steam admitted through line 52 and discharging through line 53. From vaporizer 51 the mixture of hydrocarbons and caustic discharges through line 54, containing valve 55, to debutanizer 56, which is preferably operated under a pressure of approximately 100 pounds per square inch.

The mixture admitted to debutanizer 56 comprises the added caustic soda solution, unconverted butane-butene fraction, butene polymers and small amounts of sulfuric acid esters. In order to avoid the decomposition of these esters with the liberation of sulfur dioxide, which would react with the polymers producing contaminating sulfur compounds, the heating of the debutanizer is preferably effected by direct injection of steam from an outside source through line 57, containing valve 58. This steam may be preheated before injection so that a temperature of approximately 400° F. may be maintained in the bottom of debutanizer 56. The 4-carbon atom hydrocarbon fraction vaporized in debutanizer 56, is released through line 59, containing valve 60, passed through cooler 61 and line 62, containing valve 63, to condensate receiver 64, provided with the conventional gas release line 65, containing valve 66. If desired, the condensate may be released from condensate receiver 64 through line 67, containing valve 68, or it may be withdrawn through line 69 and valve 70 by pump 71 discharging through line 72 containing valve 73 and thence conducted to storage through line 75 containing valve 74, or a part may be recycled through line 76, containing valve 77, to the top of debutanizer 56 to assist in controlling the temperature therein.

The polymers debutanized in debutanizer 56 and the commingled caustic soda solution are withdrawn through line 78 and valve 79 by pump 80, and discharged through line 81 and valve 82 into line 83, containing valve 84. The mixture of polymers and caustic passing through valve 84 is pumped by pump 85 and discharged through line 86 containing valve 87 into line 88 in which they are commingled with steam admitted from an outside source through line 89, containing valve 90. The mixture of polymer, caustic, and steam is conducted through line 88 to a time-tank, or a plurality of time-tanks, indicated as time-tank 91 in the attached diagrammatic drawing. This mixture is contacted in time-tank 91 under approximately 250 pounds pressure at temperatures of the order of 200–300° F. and then is withdrawn through line 92, containing valve 93, passed through line 94 and valve 95 to separator 96, or it may be passed from line 92 through valves 93 and 97 to line 83, already mentioned, and then recycled with or without the admission of more steam to time-tank 91.

From separator 96 the caustic soda solution diluted by condensate from the injected steam may be withdrawn through line 98, containing valve 99, and passed through line 100, containing valve 101, to the recycling line 83, already mentioned; or this diluted caustic soda solution, or a portion thereof, may be discharged through line 102, containing valve 103, to line 104 and thence to waste or storage.

The polymer purified by the treatment with caustic solution is released from separator 96 through line 105, containing valve 106, and passed to fractionator 107. Fractionator 107 is normally operated at a slight superatmospheric pressure of the order of 10 pounds per square inch with a top temperature of about 275° F. and a bottom temperature of 390° F. maintained by a reboiling coil 108, as shown, heated conveniently by steam. This fractionator which may be operated also under substantially atmospheric pressure and at altered temperature conditions functions to remove the octene fraction, or whatever finished product may be contemplated, from higher boiling fractions which may be withdrawn as bottoms from the fractionator 107 through line 109, containing valve 110, thence through cooler 111, line 112 and valve 113, to pump 114 discharging through line 115, containing valve 116, and passed through line 117 to storage.

The overhead vapors from fractionator 107, comprising principally iso-octenes, pass through line 118, containing valve 119, thence through cooler 120 and line 121, containing valve 122, to condensate receiver 123 equipped with a conventional gas release line 124, containing valve 125. The octene fraction contained in condensate receiver 123 may be withdrawn through line 126 and valve 127 by pump 128 and may be passed through line 129, containing valve 130, to the top of the fractionator column 107 to assist in controlling the temperatures therein. Also the octene withdrawn by pump 128 may be discharged through line 131, containing valve 132, and passed through line 133 to storage, or this fraction may be withdrawn from condensate receiver 123 through drawoff line 134 containing valve 135.

The essential features of the present invention have been described in sufficient detail to permit the practical operation of the process by those qualified for such work. In the following section an example is introduced to indicate the type of results obtainable in practice, though with no intent to unduly limit the broad scope of the invention.

Using 69% sulfuric acid as catalyst in an apparatus such as that indicated in the attached diagrammatic drawing, a 4-carbon atom hydrocarbon fraction containing 16% isobutene, 32% normal butenes, and 52% butanes was polymerized at 180° F. under 300 pounds pressure. Sixty percent of the butenes so treated were converted into an octane fraction hydrogenatable to iso-octane of 97-99 octane number.

During this run the debutanizer was heated to 400° F. by injection of superheated steam without formation of sulfur dioxide by decomposition of sulfuric acid esters dissolved in the polymers. The debutanized polymers were next subjected to hydrolysis in the presence of admixed caustic soda solution with heating by direct injection of steam effecting removal of the sulfuric acid esters, which if allowed to remain would undergo decomposition during the subsequent fractional distillation liberating sulfur dioxide, which in turn would react with the polymers producing contaminating sulfur compounds.

The nature of the process of the present invention and its practical application are evident from the preceding specification and illustrated data presented, although neither section is intended to unduly limit its generally broad scope.

I claim as my invention:

1. In the polymerization of normally gaseous olefins in the presence of sulfuric acid at polymerizing temperatures above atmospheric whereby there is formed a polymer liquid containing dissolved gases and sulfuric acid esters and the polymer liquid reboiled to liberate gases therefrom, the method which comprises supplying the heat for said reboiling by direct introduction of steam to said liquid to prevent decomposition of the esters and then treating the liquid with additional steam in the presence of alkali to hydrolyze and separate said esters.

2. In the polymerization of olefins in the presence of sulfuric acid at polymerizing temperatures above atmospheric whereby there is formed a polymer liquid containing sulfuric acid esters and the polymer liquid boiled to vaporize lighter components thereof, the method which comprises supplying the heat for said boiling by direct introduction of steam to said liquid to prevent decomposition of the esters and then treating the liquid with additional steam in the presence of alkali to hydrolyze and separate said esters.

3. In the polymerization of 4 carbon atom olefins in the presence of sulfuric acid at polymerizing temperatures above atmospheric whereby there is formed a polymer liquid containing 4 carbon atom hydrocarbons and sulfuric acid esters, the method which comprises introducing steam into direct contact with said liquid to vaporize 4 carbon atom hydrocarbons therefrom without substantial decomposition of said esters, and then treating the liquid with additional steam in the presence of alkali to hydrolyze and separate said esters.

CLARENCE G. GERHOLD.